United States Patent
Sheng et al.

(10) Patent No.: US 8,326,153 B2
(45) Date of Patent: Dec. 4, 2012

(54) TUNABLE DISPERSION COMPENSATOR CONFIGURED FOR CONTINUOUS SETPOINT CONTROL

(75) Inventors: Lan Sheng, Painted Post, NY (US); Aaron Zilkie, Painted Post, NY (US); Mark Summa, Painted Post, NY (US); Timothy Kent Zahnley, Spencer, NY (US); Peter G. Wigley, Corning, NY (US)

(73) Assignee: Oclaro (North America), Inc., San Jose, CA (US)

( * ) Notice: Subject to any disclaimer, the term of this patent is extended or adjusted under 35 U.S.C. 154(b) by 227 days.

(21) Appl. No.: 12/757,712

(22) Filed: Apr. 9, 2010

(65) Prior Publication Data

US 2011/0249979 A1    Oct. 13, 2011

(51) Int. Cl.
*H04B 10/00* (2006.01)
*H04B 10/12* (2006.01)
*H04J 14/02* (2006.01)

(52) U.S. Cl. ............ 398/81; 398/87; 398/147; 398/149; 398/159; 398/161

(58) Field of Classification Search .................... 398/81, 398/87, 147–149, 159, 161
See application file for complete search history.

(56) References Cited

U.S. PATENT DOCUMENTS

| | | | |
|---|---|---|---|
| 5,473,719 A | 12/1995 | Stone | |
| 5,982,791 A * | 11/1999 | Sorin et al. | 372/25 |
| 6,487,342 B1 | 11/2002 | Wu et al. | |
| 6,724,482 B2 | 4/2004 | Wu | |
| 6,728,440 B1 | 4/2004 | Wu et al. | |
| 6,731,424 B1 * | 5/2004 | Wu | 359/337.1 |
| 6,748,140 B1 | 6/2004 | Wu et al. | |
| 6,867,868 B1 | 3/2005 | Barbarossa | |
| 6,937,793 B2 | 8/2005 | Lelievre et al. | |
| 7,058,258 B2 | 6/2006 | Yamazaki | |
| 7,457,549 B2 | 11/2008 | Koganei | |
| 7,486,851 B2 | 2/2009 | Yang et al. | |
| 7,692,793 B2 | 4/2010 | Lin et al. | |
| 2003/0086647 A1 * | 5/2003 | Willner et al. | 385/37 |
| 2004/0156002 A1 | 8/2004 | Suzuki et al. | |
| 2007/0065162 A1 | 3/2007 | Kikuchi | |
| 2008/0181552 A1 * | 7/2008 | McDonald et al. | 385/5 |
| 2008/0267565 A1 | 10/2008 | Chen et al. | |
| 2009/0109540 A1 * | 4/2009 | Summa et al. | 359/615 |
| 2009/0161113 A1 * | 6/2009 | Chen et al. | 356/477 |
| 2009/0162074 A1 * | 6/2009 | Nemoto | 398/158 |
| 2009/0237380 A1 | 9/2009 | Kimura | |
| 2009/0279890 A1 | 11/2009 | Duan et al. | |

OTHER PUBLICATIONS

U.S. Appl. No. 11/938,754, Lin et al.
Finisar Corporation—White paper: "Dispersion Trimming using the Programmable Group Delay capability of the WaveShaper Family of Programmable Optical Processors", Aug. 2009, 5 pages.
PCT/US2011/031827 International Search Report (Jun. 27, 2011).

* cited by examiner

*Primary Examiner* — Dalzid Singh
(74) *Attorney, Agent, or Firm* — Patterson & Sheridan, L.L.P.

(57) ABSTRACT

A tunable dispersion compensator (TDC) is tuned from a first dispersion setpoint to a second dispersion setpoint while maintaining continuity of the dispersion. The dispersion tuning follows a pre-determined trajectory in the time domain, so that continuity of the optical dispersion across the channel optical bandwidth is maintained while minimizing all other TDC-induced optical impairments during a tuning period.

15 Claims, 5 Drawing Sheets

TUNABLE DISPERSION COMPENSATOR CONFIGURED FOR CONTINUOUS SETPOINT CONTROL

BACKGROUND OF THE INVENTION

1. Field of the Invention

Embodiments of the present invention relate generally to chromatic dispersion compensation in optical communication systems and, more particularly, to tunable dispersion compensators configured for continuous setpoint control.

2. Description of the Related Art

In optical communication systems with high data rates, such as 40 Gbs and faster, there is significant transmission penalty caused by chromatic dispersion in the optical media making up the system. Chromatic dispersion can seriously impact the propagation of light pulses in an optical system, because any light pulse has a finite spectral width, or bandwidth, and chromatic dispersion can therefore cause the different frequency components of a light pulse to propagate with different velocities. As a result, this variation in velocity causes the light pulses of an optical signal to broaden as they travel through the optical media. This phenomenon, known as "pulse spreading," can cause increased bit error rates if left unchecked.

Fixed dispersion compensators are generally used in optical systems to perform bulk dispersion compensation, leaving only residual chromatic dispersion. Residual chromatic dispersion is an artifact of the imperfect match between the chromatic dispersion of an optical signal and a fixed dispersion compensator used to perform bulk dispersion compensation at a particular location in the optical system. Because the closely spaced light pulses in high-speed optical systems are generally more susceptible to pulse spreading, at high bit rates, e.g., 40 Gbps and faster, residual chromatic dispersion can create significant transmission penalties for such systems. Long-reach optical systems such as those used in submarine networks are also similarly susceptible at lower bit rates, e.g. 10 Gbps, Tunable dispersion compensators (TDCs) are generally used throughout an optical communication system to compensate for residual chromatic dispersion, and can be precisely tuned to cancel the effects of chromatic dispersion at a specific location in the system. Chromatic dispersion is known to be the rate of change of the optical group delay response of a light pulse of an optical signal as a function of wavelength. Thus, one approach to compensating for chromatic dispersion involves passing the optical signal through a TDC that produces a rate of change of the optical group delay response with respect to wavelength opposite to that caused by the optical medium.

Problems arise, however, when the dispersion setpoint for a TDC is changed, which occurs periodically, such as when an optical channel is added to a node in an optical system or re-routed via a different optical link having different dispersion characteristics. Provisioning a link with a transponder that contains a TDC involves monitoring the eye open penalty (EOP) or bit error rate (BER) of the link and using the TDC to optimize EOP using a convergence algorithm. With a newly provisioned link, the dispersion setpoint for the TDC is also generally set to a new value. As the dispersion of the TDC is tuned abruptly from one setpoint value to another, the optical channel typically loses continuity, i.e., the optical channel passes through periods of unpredictable signal distortion due to uncontrolled dispersion of the TDC before arriving at the desired state.

Specifically, when the dispersion setpoint for an elaton-based TDC is changed, the TDC modifies the optical group delay response for each tunable etalon contained therein in order to provide the newly requested dispersion compensation value. If the TDC abruptly changes the optical group delay response of the etalons to the new setpoint, optical performance is generally not maintained, and for a finite time the optical channel may not comply with the performance specification of the optical system, a condition that is highly undesirable. This is because, as the dispersion is tuned from one setpoint to another, the optical channel may pass through time periods of unpredictable signal distortion due to uncontrolled TDC dispersion before arriving at the desired state. Alternatively, to ensure continuity of performance parameters of the optical channel at all times, the TDC can modify the spectral setpoint of each etalon via a series of small setpoint changes. At each small step change in dispersion setpoint, a PID (proportional-integral-derivative) controller minimizes overshoot and undershoot of all optical parameters of the optical channel, so that the TDC "settles" to a stable optical performance at each step. Such an approach prevents discontinuous optical performance of the optical channel, but is very time-consuming, e.g., on the order of several minutes. Thus, when a new dispersion setpoint is issued for a TDC, an optical communication system can suffer from either extended tuning time or periods of discontinuous optical performance.

Accordingly, there is a need in the art for a method of quickly adjusting a TDC from a first dispersion setpoint to a second dispersion setpoint that avoids discontinuous optical performance of an optical channel.

SUMMARY OF THE INVENTION

One or more embodiments of the present invention provide methods for adjusting a tunable dispersion compensator (TDC) from a first dispersion setpoint to a second dispersion setpoint while maintaining continuity of the dispersion and minimizing other TDC-induced impairments during the tuning period.

A method of tuning a tunable dispersion compensator having a plurality of optical group delay tuning elements, according to an embodiment of the invention, includes the steps of receiving a new TDC setpoint, calculating a TDC setpoint trajectory from a current and the new TDC setpoint, generating target trajectories for tuning coefficients of the optical group delay tuning elements corresponding to the TDC setpoint trajectory, and controlling tuning coefficients of the optical group delay tuning elements to track the target trajectories. In this method, because continuity of the dispersion is maintained and other TDC-induced impairments are minimized during the tuning period, the control of the tuning coefficients can be stopped before the new TDC setpoint has been reached, and the TDC setpoint reached when such control is stopped represents a valid TDC setpoint.

A method of changing a setpoint of a tunable dispersion compensator (TDC) having at least a first optical group delay tuning element and a second optical group delay tuning element, according to an embodiment of the invention, includes the steps of retrieving first and second target tuning coefficient trajectories, each corresponding to a new TDC setpoint, controlling a tuning coefficient of the first optical group delay tuning element to track the first target tuning coefficient trajectory and controlling a tuning coefficient of the second optical group delay tuning element to track the second target coefficient trajectory.

A tunable dispersion compensator, according to an embodiment of the invention, includes at least first and second optical group delay tuning elements and a controller which monitors an optical group delay of the first and second optical group delay tuning elements and the controller is configured to control tuning coefficients of the first and second optical group delay tuning elements in accordance with target optical group delay coefficient trajectories of the first and second optical group delay tuning elements.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate methods for adjusting a tunable dispersion compensator (TDC) from a first dispersion setpoint to a second dispersion setpoint while maintaining continuity of the dispersion during the tuning period. Specifically, the dispersion of the TDC is changed from the first setpoint to the second setpoint by following a pre-determined dispersion trajectory in the time domain, so that continuity of the optical channel is maintained at all times during the transition of the TDC between the first and second setpoints. The TDC is made up of a plurality of optical tuning elements, each contributing one or more optical group delay peaks to the aggregate optical group delay of the TDC, i.e., the dispersion of the TDC. At each point on the pre-determined dispersion trajectory, the optical group delay of each of the optical tuning elements is adjusted to a specific, known setting to provide an aggregate optical group delay that meets continuity requirements for the optical channel. TDC dispersion varies continuously from the first setpoint to the second setpoint, and not via a series of small steps that each involve the time-consuming process of convergence via closed-loop control. In some embodiments, a stop command is implemented to lock TDC dispersion when optimum BER, EOP, or other system feedback has been obtained. In some embodiments, temperature trajectories and PID control coefficients are optimized to facilitate movement of TDC dispersion from the first setpoint to the second setpoint as quickly as possible.

Figure 1:
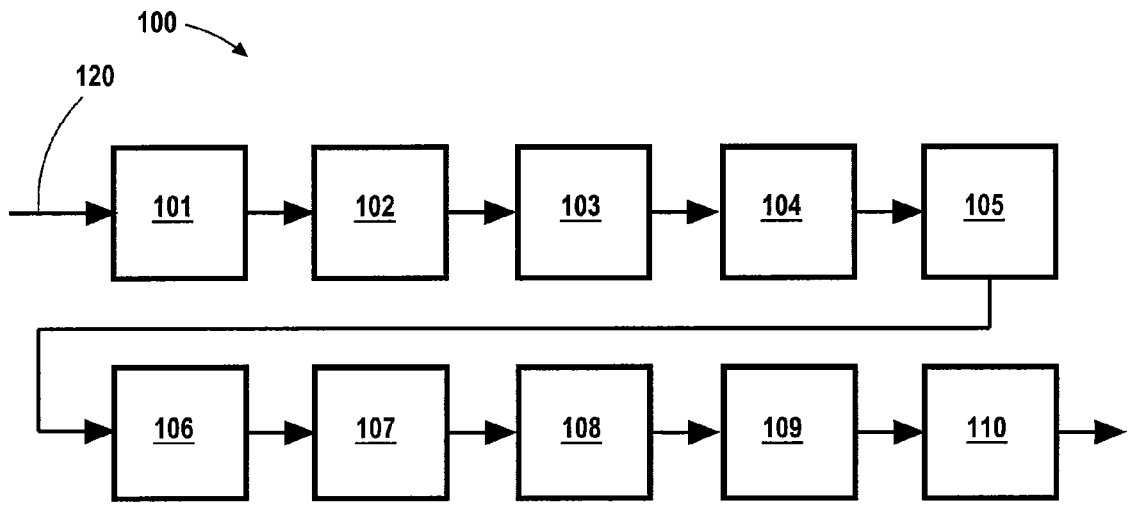
FIG. 1 is a conceptual block diagram of a tunable dispersion compensator (TDC) that may benefit from embodiments of the invention.

FIG. 1 is a conceptual block diagram of a TDC 100 that may benefit from embodiments of the invention. TDC 100 has a plurality of optical tuning elements, i.e., etalons 101-110, that are sequentially cascaded to process an incoming optical channel 120 as shown. In alternative embodiments, TDC may include more or less than ten etalons. Etalons 101-110 may include any suitable etalon structures, such as Gires-Tournois (GT) etalons, Fabry-Pérot (FP) etalons, and combinations thereof.

A Fabry-Pérot etalon is typically made of a transparent plate with two reflecting surfaces. An alternate design is composed of a pair of transparent plates with a gap in between, with any pair of the plate surfaces forming two reflecting surfaces. The GT etalon is essentially an FP etalon with one surface highly reflective. The transmission spectrum of an FP etalon as a function of wavelength exhibits periodic transmission peaks corresponding to resonances of the etalon, and the wavelength of such transmission peaks are known to vary with the temperature (e.g., tuning coefficient) of the etalon due to the thermo-optic effect and thermal expansion. The thermo-optic effect, i.e., the variation of refractive index with temperature, changes the optical path length between the reflecting surfaces of the etalon, and the coefficient of thermal expansion (CTE) changes the physical spacing between the reflecting surfaces of the etalon. Each of etalons 101-110 has an associated optical group delay response, described below in conjunction with FIG. 2. Because the position of such an optical group delay response in the frequency domain is a function of the central wavelength of the transmission peaks of the etalon, and because transmission peak wavelengths vary with the temperature of the etalon, the optical group delay response of the etalon can be adjusted in the frequency domain by changing the temperature of the etalon. To put it another way, a tuning coefficient of each etalon controls a free-spectral-range (FSR) of the etalon which adjusts a center frequency of an optical group delay response of the etalon. The tuning coefficient described relates to temperature control, however it is to be noted that other tuning coefficients may be used, such as voltage/current control, material mechanically control, material strain/stretching fiber, opto-mechanical, magneto-optic, or a carrier-induced refractive index change.

Figure 2:
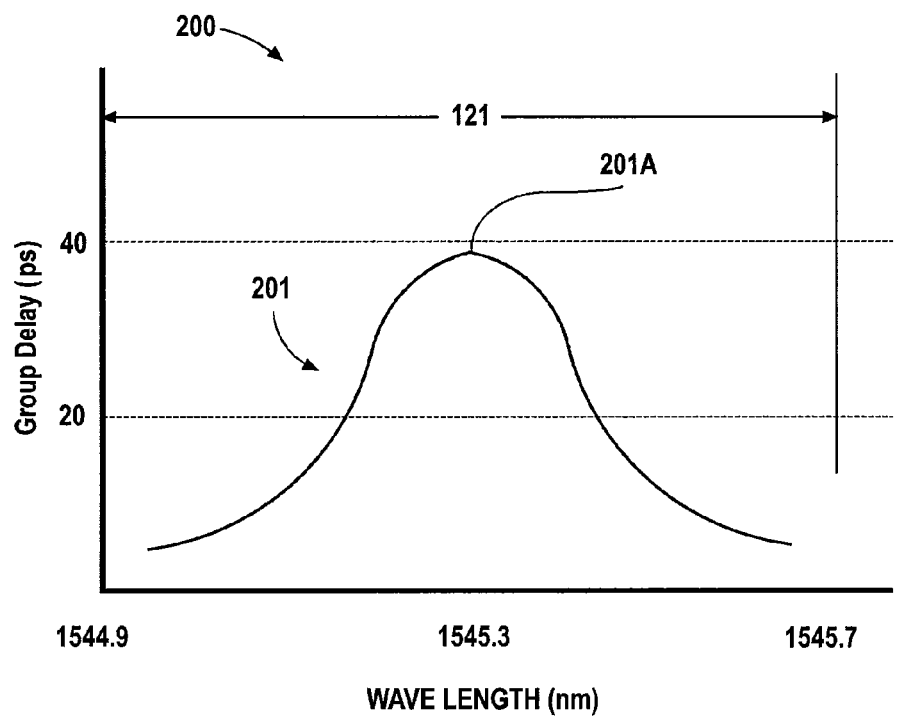
FIG. 2 is a graph illustrating the optical group delay response of an etalon of a TDC.

FIG. 2 is a graph 200 illustrating the optical group delay response 201 of etalon 101 of TDC 100. Optical group delay response 201 quantifies the optical group delay, in picoseconds (ps), of etalon 101 with respect to light wavelength. The optical group delay of an optical element, such as a dielectric mirror, a segment of optical fiber, or an etalon, is defined as the derivative of the change in spectral phase with respect to the angular frequency, and has the units of time. As shown, optical group delay response 201 has at least one optical group delay peak 201A that is positioned in the passband 121 of optical channel 120. By way of example, optical channel 120 is illustrated in FIG. 2 with a passband extending from 1544.9 nm to 1545.7 nm. It is understood that embodiments of the invention may be equally beneficial for optical channels having a passband substantially different than optical channel 120, either in terms of bandwidth or position in the frequency domain. In FIG. 2, optical group delay peak 201A is shown substantially centered at wavelength 1545.3 nm, but because the position of delay peak 201A can be adjusted in the frequency domain by changing the temperature of etalon 101, delay peak 201A is not fixed at wavelength 1545.3 nm.

Removing residual chromatic dispersion in an optical channel generally involves quantifying the dispersion, then tuning a TDC to compensate for the measured dispersion. On a graph of optical group delay response as a function of light wavelength, the measured residual dispersion is represented by the slope of the optical group delay response, i.e., the rate of change of the optical group delay response with respect to wavelength. For an etalon-based TDC, a compensatory dispersion can be produced by synthesizing an optical group delay response curve having a slope with respect to wavelength that is equal but opposite in sign to the measured optical group delay response slope, i.e., the measured residual dispersion. The compensatory optical group delay response curve is synthesized by adjusting and summing the optical group delay responses of the TDC etalons to form an aggregated optical group delay response having the desired slope. The position in the wavelength domain of each etalon optical group delay response is adjusted by controlling the temperature of the associated etalon.

Figure 3:
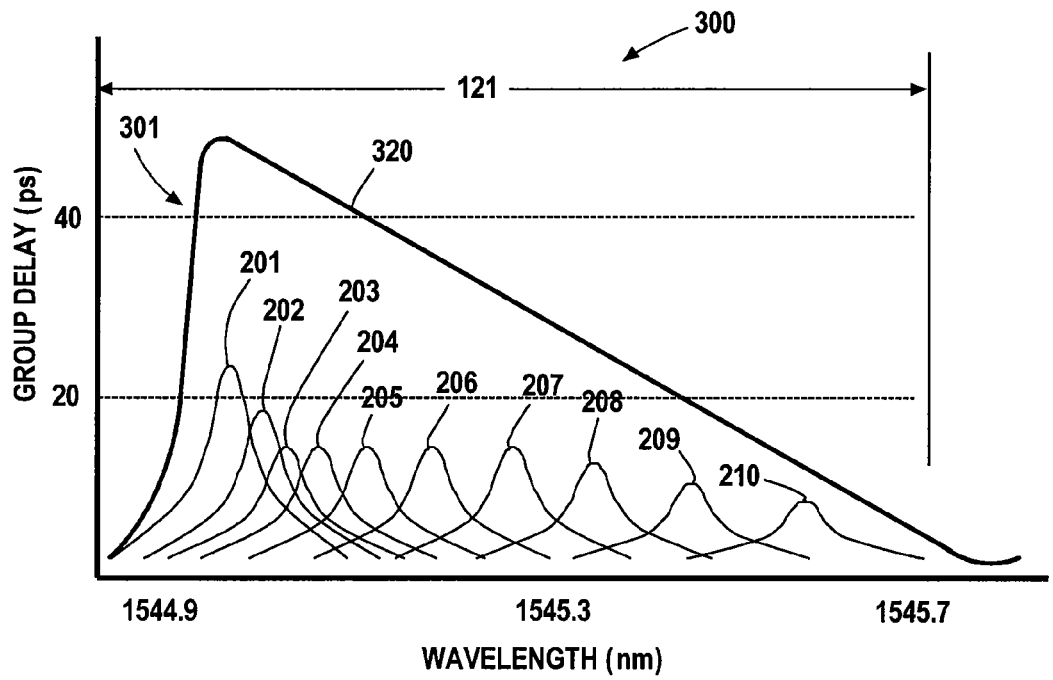
FIG. 3 is a graph illustrating an aggregate optical group delay response of a TDC, according to embodiments of the invention.

FIG. 3 is a graph 300 illustrating an aggregate optical group delay response 301 of TDC 100, according to embodiments of the invention. In addition, graph 300 depicts the optical group delay responses 201-210 for etalons 101-110, respectively. Aggregate optical group delay response 301 is the summation of the individual optical group delay responses 201-210 of etalons 101-110. When adjusted to properly compensate for residual dispersion of optical channel 120, aggregate optical group delay response 301 has a substantially linear slope 320 that is equal and opposite in sign to the residual dispersion measured for optical channel 120, i.e., the optical group delay response rate of change. In addition, aggregate optical group delay response 301 compensates for residual dispersion in optical channel 120 more effectively when the portion of aggregate optical group delay response 301 having linear slope is substantially centered in the pass band of optical channel 120.

Figure 4:
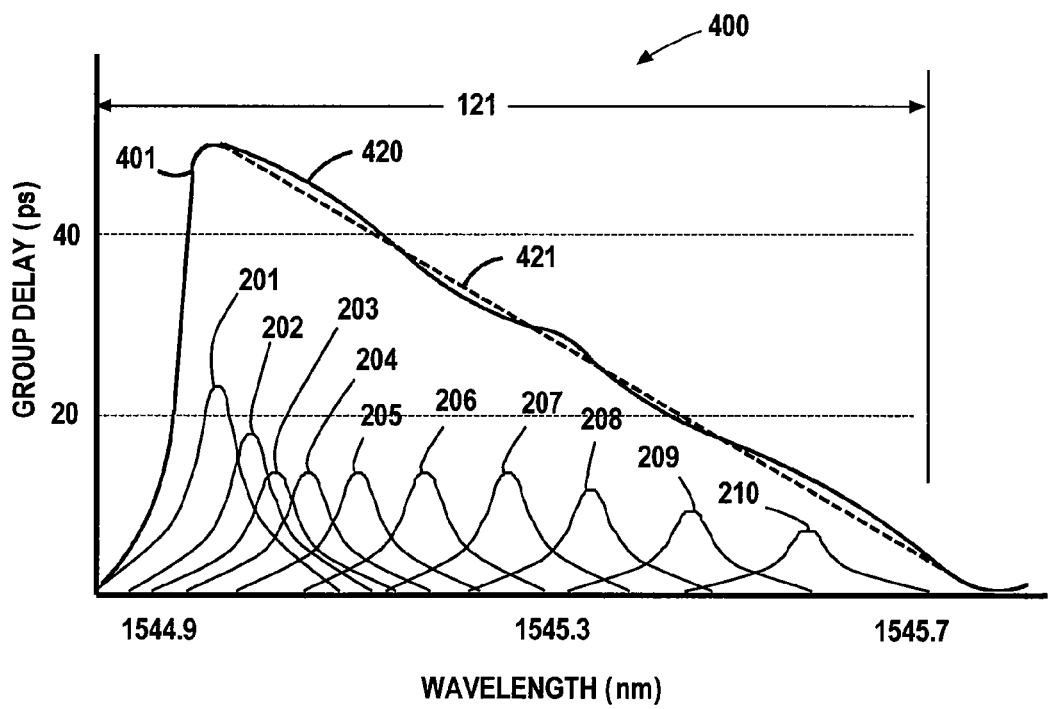
FIG. 4 is a graph illustrating an aggregate optical group delay response of a TDC having relatively poor optical group delay ripple.

In FIG. 3, aggregate optical group delay response 301 is depicted with a substantially linear slope 320, which is the ideal case. In practice, because aggregate optical group delay response 301 is synthesized by superposing a series of bell-shaped curves, i.e., optical group delay responses 201-210, slope 320 only approximates a straight line and will therefore be characterized by a certain measure of "optical group delay ripple." Optical group delay ripple is a measure of optical performance of an optical channel that quantifies the variance of slope 320 from an ideal straight line of constant slope, and may be defined as the maximum peak-to-peak ripple of a remainder function, where the remainder function is the difference between an aggregate optical group delay response and a straight-line function fit to the aggregate optical group delay response. FIG. 4 is a graph 400 illustrating an aggregate optical group delay response 401 of a TDC having relatively poor optical group delay ripple. As shown, slope 420 varies substantially from a best-fit linear approximation of an ideal linear slope, indicated by dashed line 421.

It is known that the optical performance of a TDC, including slope 320, the centering of aggregate optical group delay response 301, and optical group delay ripple of slope 320, can be optimized by repositioning the center wavelength of the peak response of each of optical group delay responses 201-210. As described above, each of optical group delay responses 201-210 is repositioned with respect to wavelength by independently controlling the temperature of each associated etalon. The materials for each etalon may be selected to enhance the thermo-optic effect and thereby increase the wavelength range over which each etalon can be positioned during TDC tuning. Silicon-based materials are known to have a large thermo-optic coefficient. For example, the thermo-optic coefficient of single-crystal silicon is approximately 1.9 to $2.4 \times 10^{-4}$ per degree K over the temperature ranges used for tuning etalons. Thus, etalons formed from amorphous silicon, polysilicon, and preferably single-crystal silicon are well-suited to benefit from embodiments of the invention. Similarly, the dimensions and surface reflectivities of each etalon may be selected so that during the tuning process, the optical group delay response of each etalon may be positioned at substantially any point in the bandpass of optical channel 120. In this way, the optical group delay response of each etalon may be used to contribute to either a positive or a negative slope for the TDC aggregate optical group delay response, i.e., aggregate optical group delay response 301.

Figure 5:
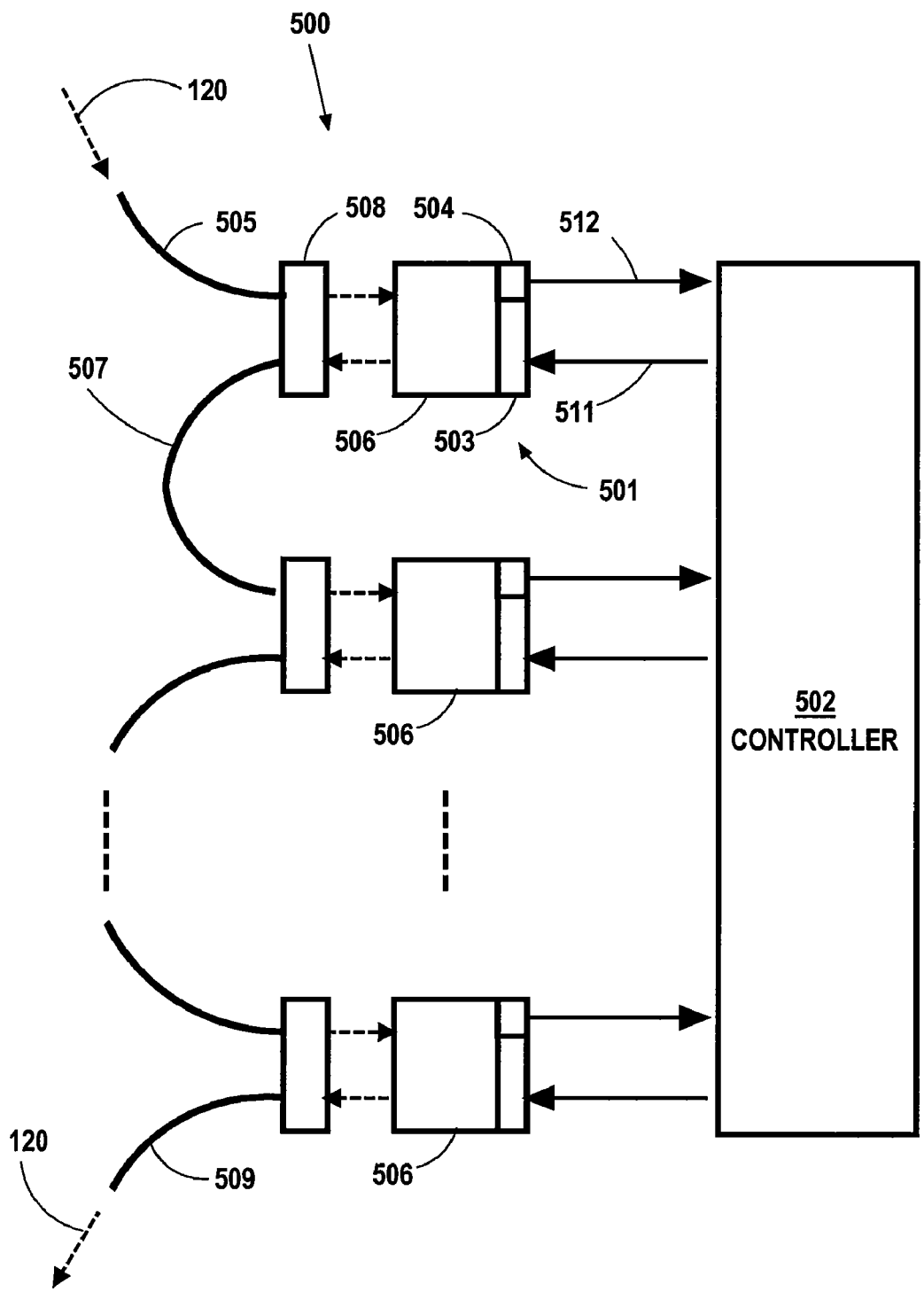
FIG. 5 is a functional block diagram of a TDC that includes an array of Gires-Tournois interferometer (GTI) etalon assemblies that may benefit from embodiments of the invention.

FIG. 5 is a functional block diagram of a TDC 500 that includes an array of Gires-Tournois interferometer (GTI) etalon assemblies 501 that may benefit from embodiments of the invention. The array includes a plurality of GTI etalon assemblies 501, e.g., 12-16 or more. TDC 500 includes a controller 502 that may be physically incorporated in the structure of TDC 500 with GTI etalon assemblies 501, e.g., on a printed circuit board assembly, or may be disposed remotely therefrom. Controller 502 is electronically coupled to each of GTI etalon assemblies 501, and may include one or more general-purpose processors, such as micro-processors, digital signal processors (DSP), and/or special-purpose processors, e.g., application-specific integrated circuits (ASIC). Controller 502 also includes memory blocks, including ROM, RAM, EEPROM, Flash or other memory blocks, as required to facilitate the performance of embodiments of the invention by TDC 500.

Each GTI etalon assembly 501 of TDC 500 includes a solid GTI etalon 506, a heater 503 and temperature-sensing device 504 disposed on the solid GTI etalon 506, and one or more optical elements, such as a fiber collimating element 508, to direct, align, collimate and/or focus optical channel 120 as required when entering and leaving each GTI etalon assembly 501. Heater 503 may be any suitable heating device that can be controlled by controller 502 to provide the necessary heat energy to solid GTI etalon 506 for the purposes of TDC tuning. In one embodiment, heater 503 is a resistive heater element, such as a thick film ceramic element formed on one or more surfaces of solid GTI etalon 506. Temperature-sensing device 504 may be any temperature-sensing apparatus having the suitable size, sensitivity, response time, and communications interface to provide accurate and precise temperature feedback to controller 502 during TDC tuning. In one embodiment, temperature-sensing device 504 is a negative-temperature coefficient (NTC) thermistor. An input fiber 505 directs an optical channel, such as optical channel 120, to the first GTI etalon assembly 501, and an output fiber 509 directs optical channel away from TDC 500 after dispersion compensation has been performed by TDC 500. Optical fibers 507 optically link GTI etalon assemblies 501 to each other in a cascaded series as shown.

TDC 500 maintains dispersion at a desired dispersion setpoint by using individual closed-loop control for each GTI etalon assembly 501. Based on characterization performed prior to normal operation of TDC 500, the optical group delay response with respect to wavelength for each of GTI etalon assemblies 501 is known as a function of etalon temperature, i.e., a one-to-one mapping has been established between the optical group delay response of each etalon and etalon temperature. In addition, the characterization process can determine the optimal positioning of the optical group delay responses of GTI etalon assemblies 501 that produces a suitable aggregate optical group delay response for a particular dispersion setpoint. Consequently, a suitable aggregate optical group delay response can be synthesized during operation by TDC 500 to compensate for a measured residual dispersion in an optical channel by controlling the temperature of each etalon contained therein to a predetermined value. The characterization of GTI etalon assemblies 501 referred to herein may include empirical and predictive methods, i.e., measurement data and theoretical data. Such characterization may be performed at multiple wavelength channels, multiple temperatures, and in fine enough increments to account for any non-linearities in optical group delay response as a function of wavelength channel and temperature. A person of skill in the art, having performed such characterization of TDC 500 and GTI etalon assemblies 501, can readily devise a suitable aggregate optical group delay response for any particular dispersion setpoint, as well as etalon temperature trajectories for changing a TDC, such as TDC 500, from a first dispersion setpoint to a second dispersion setpoint. Etalon temperature trajectories, according to embodiments of the invention, are described below in conjunction with FIG. 6.

In operation, TDC 500 maintains an aggregate optical group delay response that matches a dispersion setpoint by performing individual closed-loop temperature control of each of GTI etalon assemblies 501 using controller 502, heaters 503, and temperature-sensing devices 504. For clarity, closed-loop control is now described in terms of a single GTI etalon assembly 501. Power input, depicted by arrow 511, is provided to heater 503 by controller 502. The level of power applied to heater 503 may be voltage-controlled or current-controlled. The power applied by controller 502 increases, decreases, or maintains the temperature of solid GTI etalon 506 and temperature-sensing device 504, depending on the current temperature of solid GTI etalon 506 relative to the temperature setpoint. Temperature-sensing device 504 reports the current temperature of solid GTI etalon 506 to controller 502 via signal 512. In one embodiment, temperature-sensing device 504 is an NTC thermistor whose resistance varies with temperature. Controller 502 monitors the temperature of solid GTI etalon 506 via signal 512, and increases or decreases the power applied to solid GTI etalon 506 as required so that solid GTI etalon 506 is maintained as closely as possible to the temperature setpoint. Consequently, GTI etalon assembly 501 produces an optical group delay response at the desired wavelength. The optical group delay response of each of the remaining GTI etalon assemblies 501 is controlled by controller 502 in a similar fashion. In this way, TDC 500 produces an aggregate optical group delay response for a particular dispersion setpoint that has a substantially linear slope, has little optical group delay ripple, and compensates for measured dispersion in optical channel 120.

Embodiments of the invention contemplate a method of changing a TDC, such as TDC 500, from a first dispersion setpoint to a second dispersion setpoint while maintaining continuity of the dispersion performance during the tuning period. In order to maintain such continuity at all times, the dispersion of the TDC is changed from the first setpoint to the second setpoint by following a pre-determined dispersion trajectory in the time domain. At each point along this trajectory, i.e., at any specific time, the optical group delay of each of the etalons of the TDC is adjusted to a specific, known setting to provide an aggregate optical group delay that meets continuity requirements for the optical channel. Because the optical group delay response of each of the etalons has been mapped to etalon temperature, the TDC can adjust dispersion along the pre-determined trajectory in time by controlling the etalons to the appropriate temperature. Thus, for each etalon of the TDC, temperature also follows a pre-determined trajectory in time. Consequently, the TDC can maintain continuity of the optical channel while dispersion changes from the first dispersion setpoint to the second dispersion setpoint without the need for measuring optical channel performance directly, e.g., EOP, BER, etc.

In contrast to prior art approaches for changing TDC 500 from a first dispersion setpoint to a second dispersion setpoint, embodiments of the invention do not rely on feedback directly quantifying optical channel performance as a control parameter. As noted in the description of the related art, such an approach is either time-consuming or results in a period of unacceptable optical performance for the optical channel. Instead, each etalon temperature is controlled to follow a specific, pre-determined trajectory in time, where the temperature trajectory of each etalon is independently controlled, and etalon temperature is the only control parameter. Controller 502 applies power to each heater 503 to control the temperature of each solid GTI etalon 506 to follow the appropriate temperature trajectory.

Figure 6:
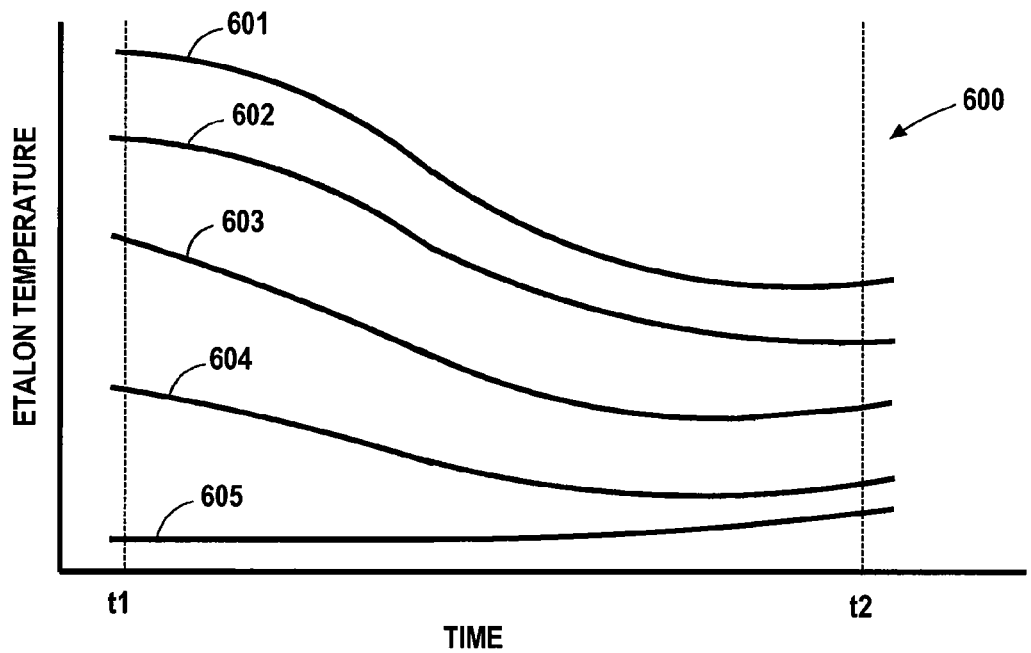
FIG. 6 is a graph illustrating temperature trajectories for five solid GTI etalons as a TDC is changed from a first dispersion setpoint to a second dispersion setpoint, according to embodiments of the invention.

FIG. 6 is graph 600 illustrating temperature trajectories 601-605 for five solid GTI etalons 506 as TDC 500 is changed from a first dispersion setpoint to a second dispersion setpoint, according to embodiments of the invention. For clarity, only five temperature trajectories are depicted, but in practice all solid GTI etalons 506 of TDC 500 follow a temperature trajectory when TDC 500 is changed from a first dispersion setpoint to a second dispersion setpoint.

At time t1, the five etalons are adjusted, via temperature, to a first dispersion setpoint to produce an aggregate optical group delay response having a substantially linear slope that matches the first dispersion setpoint and has an acceptable level of optical group delay ripple. Thus, at time t1, optical channel 120 has acceptable optical performance. At time t2, the five etalons have been adjusted, via temperature, to the second dispersion setpoint, and produce an aggregate optical group delay response having a substantially linear slope that matches the second dispersion setpoint and has an acceptable level of optical group delay ripple. In addition, temperature trajectories 601-605 are selected so that at any time between t1 and t2, optical channel 120 has acceptable optical performance. Specifically, the aggregate optical group delay of TDC 500 meets continuity requirements for optical channel 120 by having a substantially linear slope that exhibits low optical group delay ripple.

As shown, each of temperature trajectories 601-605 follows an independent path. Because temperature trajectories 601-605 describe the temperatures of independently controlled etalons, characteristics of these trajectories may vary substantially from one another, including net temperature gain/loss, slope, number and location of inflection points, etc. Temperature trajectories 601-605 are determined prior to normal operation of TDC 500 based on characterization of GTI etalon assemblies 501, and are realized by varying input power to heater 503 of each GTI etalon assembly 501 accordingly, i.e., as a function of time. Thus, rather than following an arbitrary temperature trajectory in time, the temperature of each solid GTI etalon 506 is explicitly controlled to follow the pre-determined temperature trajectory between two dispersion setpoints of TDC 500. In one embodiment, to better follow temperature trajectories 601-605, controller 502 may use a PID control scheme to minimize error and more closely follow temperature trajectories 601-605. Such PID control is not to be confused with the PID control used by prior art TDCs to settle dispersion using feedback of optical channel performance as the control parameter. According to embodiments of the invention, when TDC 500 is changed from a first dispersion setpoint to a second dispersion setpoint, etalon temperature is used as the control parameter.

In FIG. 6, temperature trajectories 601-605 are depicted as smooth, continuous curves. In practice, each temperature trajectory is made up of a plurality of small but discrete changes in temperature with respect to time. However, embodiments of the invention are not to be confused with prior art approaches, in which a TDC modifies the wavelength setpoint of each etalon, i.e., the etalon temperature setpoint, via a series of small intermediary setpoint changes, and a PID controller minimizes overshoot and undershoot of all optical parameters of the optical channel at each small step change in dispersion setpoint. According to embodiments of the invention, as each new target temperature is reached on a temperature trajectory, controller 502 does not measure optical channel performance in an attempt to settle dispersion for TDC 500 at the new temperature setpoint. Instead, controller 502 uses etalon temperature as the feedback parameter to maintain optical performance of optical channel 120.

In one embodiment, dispersion of TDC 500 may be locked or frozen at a particular value when optimal values of one or more optical performance parameters, such as EOP and BER, have been obtained. In such an embodiment, measurement of optical performance is not used as a control parameter, i.e., feedback, for facilitating or expediting convergence of a dispersion algorithm. However, if satisfactory optical performance is measured, the dispersion of TDC 500 may be locked at the current value before the temperatures trajectories have been completely traversed.

Figure 7:
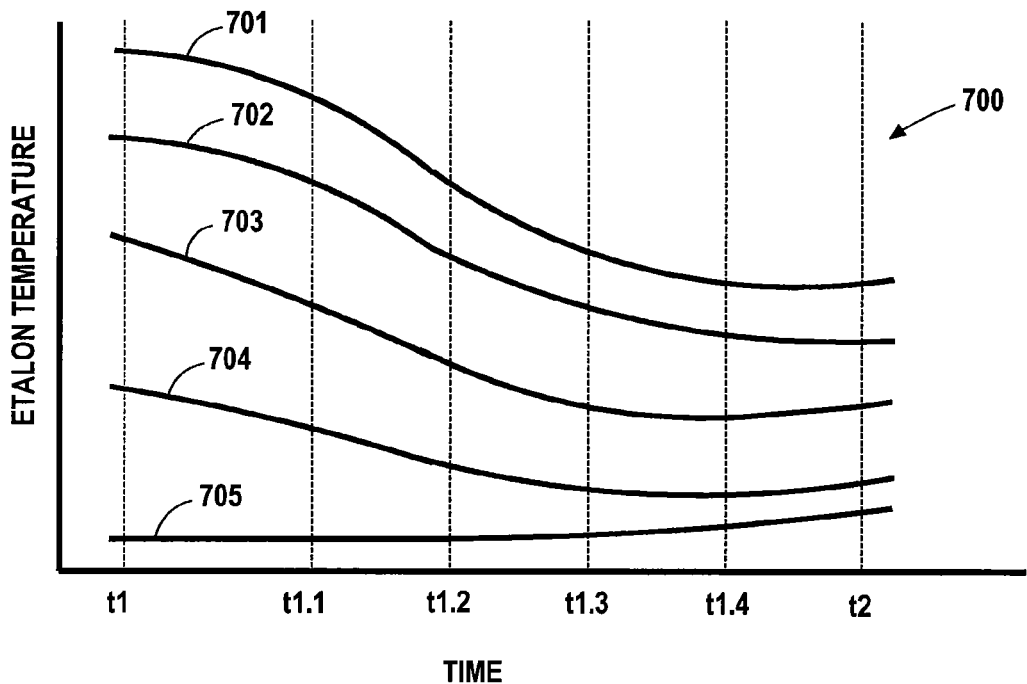
FIG. 7 is a graph illustrating etalon temperature trajectories as a TDC is changed from a first dispersion setpoint to a second dispersion setpoint, according to embodiments of the invention.

In one embodiment, specific points on the temperature trajectories of each solid GTI etalon 506 are calculated based on dispersion setpoint calibration data. FIG. 7 is graph 700 illustrating etalon temperature trajectories 701-705 as TDC 500 is changed from a first dispersion setpoint to a second dispersion setpoint, according to embodiments of the invention. Thus, at time t1, five etalons are set to a first dispersion setpoint to produce an aggregate optical group delay response having a substantially linear slope that matches the first dispersion setpoint. Similarly, at time t2, five etalons are adjusted, via temperature, to a second dispersion setpoint to produce an aggregate optical group delay response having a substantially linear slope that matches the second dispersion setpoint.

Etalon temperature trajectories 701-705 are substantially similar to temperature trajectories 601-605 in FIG. 6, except that etalon temperature trajectories 701-705 include points, i.e., temperature values, that correspond to calibrated dispersion setpoints for TDC 500. Specifically, at time t1.1, the etalon temperatures of etalon temperature trajectories 701-705 are defined by an intermediate dispersion setpoint that falls between the dispersion setpoint at time t1 and the dispersion setpoint at time t2, where etalon temperature values at such an intermediate dispersion setpoint have been previously determined. At time t1.2, the etalon temperatures of etalon temperature trajectories 701-705 are defined by an intermediate dispersion setpoint that falls between the dispersion setpoint at time t1.1 and the dispersion setpoint at time t2. At times t1.3 and t1.4, the etalon temperatures of etalon temperature trajectories 701-705 are similarly defined. In such an embodiment, the remaining points making up etalon temperature trajectories 701-705 may be defined via interpolation or other means known in the art.

In one embodiment, a conventional dispersion convergence algorithm using feedback measuring optical performance may be applied to the etalon temperatures of TDC 500 once the second dispersion setpoint has been reached. Such an embodiment ensures optimal performance of the optical channel while taking advantage of the short duration switching time from the first dispersion setpoint to the second dispersion setpoint.

In other embodiments, the method could be used for changing the dispersion from the first setpoint to the second setpoint by following a pre-determined dispersion trajectory and minimizing all other TDC-induced optical impairments during the transition in TDC devices that tune the FSRs of a plurality of GT etalons using mechanisms other than thermo-optic tuning (e.g., electro-optic, opto-mechanical, magneto-optic, acousto-optic, piezo-electric, or carrier-induced refractive index change mechanisms). For example, in one embodiment, the TDC may be tuned using electro-optic tuning. The TDC would include a plurality of etalons, wherein each etalon includes an electro-optic material, such as Lithium niobate. As known in the industry, the electro-optic effect is a change in the optical properties of a material in response to an electric field that varies slowly compared with the frequency of light. A voltage (e.g., tuning coefficient) may be applied to each etalon to control the free-spectral-range (FSR) of the etalon which adjusts a center frequency of an optical group delay response of the etalon. Similar to the etalon temperature trajectories described herein, the etalon voltage trajectories would be used for changing the TDC from a first dispersion setpoint to a second dispersion setpoint. In another embodiment, the TDC may be tuned using opto-mechanical tuning. The TDC would include a plurality of etalons, wherein each etalon includes a rotation motor that would change the angle that light that would hit a portion of the etalon. A motor position (e.g., tuning coefficient) would be used to control the free-spectral-range (FSR) of the etalon which adjusts a center frequency of an optical group delay response of the etalon. Similar to the etalon temperature trajectories described herein, the etalon motor position trajectories would be used for changing the TDC from a first dispersion setpoint to a second dispersion setpoint.

In other embodiments, the method could be used for changing the dispersion from the first setpoint to the second setpoint by following a pre-determined dispersion trajectory and tuning coefficient trajectories minimizing all other TDC-induced optical impairments during the transition in TDC devices that tune the tuning coefficients of a plurality of optical group delay tuning elements which are different from GT etalons (e.g., optical waveguide delay lines, ring resonators, liquid-crystal or liquid-crystal-on-silicon phase retarders, or Bragg grating elements).

In one embodiment, the TDC may have optical group delay tuning elements such as ring-resonators, wherein the tuning coefficients of each ring-resonator controls a free-spectral-range (FSR) of the ring-resonator which adjusts a center frequency of an optical group delay response of the ring-resonator. Each ring-resonator may have a ring-shaped waveguide connected to a heater. When power is supplied, the heater controls the temperature (e.g., tuning coefficient) of the ring-shaped waveguides. In this way, the central wavelength of the delay time spectrum of the ring resonator may be controlled to a desired value. Other tuning coefficients that could be used for the ring-resonator may be voltage/current control, or material mechanically control. In a similar manner as described herein, a method of using a TDC having ring-resonators may be used for changing the TDC from a first dispersion setpoint to a second dispersion setpoint.

In another embodiment, the TDC may have optical group delay tuning elements such as optical waveguide delay lines, wherein a tuning coefficient of each waveguide delay line adjusts an optical path length of the waveguide delay line. Tuning coefficients that could be used with the optical waveguide delay lines may be voltage/current control, temperature control, material mechanically control or control by material strain/stretching fiber. In a similar manner as described herein, a method of using a TDC having optical waveguide delay lines may be used for changing the TDC from a first dispersion setpoint to a second dispersion setpoint.

In another embodiment, the TDC may have optical group delay tuning elements such as Bragg grating elements, wherein the tuning coefficient of each Bragg Grating element adjusts a center frequency of an optical group delay response of the Bragg grating element. The Bragg grating elements may be connected to a tuning device that applies a tuning force to the Bragg grating element. Tuning coefficients that could be used with the Bragg grating elements may be voltage control, temperature control, material mechanically control or control by material strain/stretching fiber. In a similar manner as described herein, a method of using a TDC having Bragg grating elements may be used for changing the TDC from a first dispersion setpoint to a second dispersion setpoint.

In another embodiment, the TDC may have optical group delay tuning elements such as liquid-crystal or liquid-crystal-on-silicon (LCOS) variable-phase-retarding pixels, wherein the tuning coefficient of each pixel is a voltage which controls a phase-retardance of each pixel. Tuning coefficients that could be used with the liquid-crystal or liquid-crystal-on-silicon (LCOS) variable-phase-retarding pixels may be voltage control. In a similar manner as described herein, a method of using a TDC having liquid-crystal or liquid-crystal-on-silicon (LCOS) variable-phase-retarding pixels may be used for changing the TDC from a first dispersion setpoint to a second dispersion setpoint.

Figure 8:
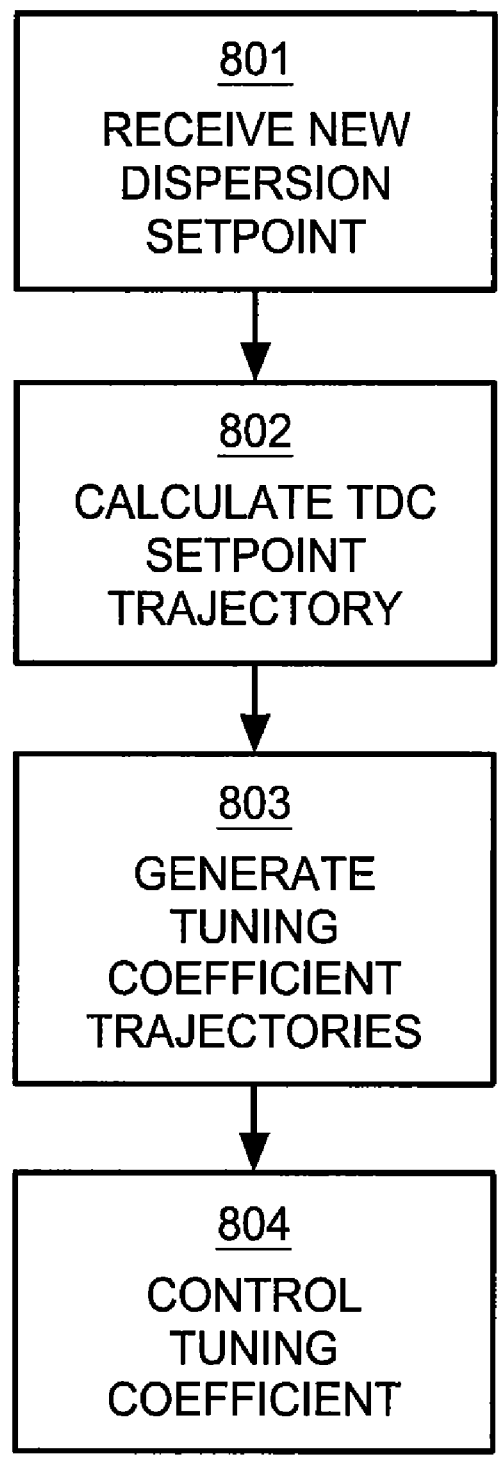
FIG. 8 is a flow chart that summarizes, in a stepwise fashion, a method for adjusting a TDC from a first dispersion setpoint to a second dispersion setpoint, according to one or more embodiments of the invention.

FIG. 8 is a flow chart that summarizes, in a stepwise fashion, a method 800 for adjusting a TDC from a first dispersion setpoint to a second dispersion setpoint, according to one or more embodiments of the invention. Method 800 is described in terms of a TDC substantially similar to TDC 500 in FIG. 5. However, other TDCs may also benefit from the use of method 800. The commands for carrying out steps 801-804 may reside in the TDC control algorithm and/or as values stored in the electronic circuits of the TDC or in associated storage media. As described above in conjunction with FIG. 5, prior to the first step of method 800, characterization of TDC 500 is performed to construct trajectories for each of solid GTI etalons 506.

In step 801, a new dispersion setpoint is requested of TDC 500. The new dispersion setpoint may be the result of an optical channel being added or re-routed in an optical communications system.

In step 802, the TDC setpoint trajectory is calculated based upon the current TDC setpoint and the new TDC setpoint. The TDC setpoint trajectory is generally the change in the setpoint with respect to time.

In step 803, the appropriate tuning coefficient trajectories are generated or retrieved for adjusting the dispersion of TDC 500 from the original dispersion setpoint to the new dispersion setpoint. The appropriate trajectories may be stored in a look-up table or other means in the art.

In step 804, the tuning coefficient is controlled. As set forth herein, the tuning coefficient could be any number of different types tuning coefficients, such as a voltage, a current, a temperature, a mechanical force, or a tuning force. For instance, if the tuning coefficient is temperature, then a power is applied to heater 503 of a GTI etalon assembly 501 to change the temperature of solid GTI etalon 506 to follow the temperature trajectory of the etalon with respect to time changes from a first etalon temperature setpoint to a second etalon temperature setpoint along a pre-determined path. The first etalon temperature setpoint corresponds to the current dispersion setpoint of TDC 500, and the second etalon temperature setpoint corresponds to the new dispersion setpoint of TDC 500. By following the pre-determined etalon temperature trajectory, each etalon of TDC 500 will, in combination with the other etalons of TDC, produce an aggregate optical group delay that prevents discontinuity of optical channel 120 as TDC 500 is adjusted to the new dispersion setpoint.

The temperature trajectory and PID control of etalon temperature that takes place in step 804 may be optimized to minimize the time required to reach the new dispersion setpoint. In such an embodiment, the temperature trajectory extends over a shorter time between the original etalon temperature setpoint to the new etalon temperature setpoint. Consequently, a provisioning time for TDC 500 to tune to the new dispersion setpoint is reduced, but at the cost of potentially degrading continuity during this provisioning time. Alternatively, the temperature trajectory and PID control of etalon temperature that takes place in step 804 may be optimized for greater continuity of optical channel 120 as TDC 500 adjusts to the new dispersion setpoint. In such an embodiment, the etalon temperature trajectory extends over a longer time between the original etalon temperature setpoint to the new etalon temperature setpoint. Thus, the provisioning time for TDC 500 to tune to the new dispersion setpoint is increased, but the continuity of optical channel 120 during this provisioning time is improved. Step 804 is performed simultaneously by all GTI etalon assemblies 501 of TDC 500, and the temperature trajectories for each etalon have the same duration in time.

In sum, embodiments of the invention facilitate quickly, adjusting a TDC from a first dispersion setpoint to a second dispersion setpoint without significant discontinuity. Times required for such a dispersion setpoint adjustment can be reduced by as much as an order of magnitude or more. For example, using embodiments of the invention, a TDC can be tuned to a new dispersion setpoint in two or three seconds rather than in 30 seconds to several minutes—the time generally required by prior art approaches. In addition, the tuning process itself can be optimized by modifying the duration of etalon temperature trajectories. In so doing, an optimal trade-off between continuity and tuning speed can be readily devised, i.e., either shorter, less precise provisioning times or longer, more precise provisioning times can be used.

While the foregoing is directed to embodiments of the present invention, other and further embodiments of the invention may be devised without departing from the basic scope thereof, and the scope thereof is determined by the claims that follow.

We claim:

1. A method of tuning a tunable dispersion compensator (TDC) from a present TDC setpoint to a new TDC setpoint, the TDC having a plurality of optical group delay tuning elements, comprising:
   retrieving target trajectories that have been defined with respect to time for tuning coefficients of the optical group delay tuning elements, wherein each optical group delay tuning element is associated with a different one of the target trajectories; and
   controlling tuning coefficients of the optical group delay tuning elements such that tuning coefficients of each of the optical group delay tuning elements track the target trajectory associated therewith in time until the new TDC is reached, wherein the new TDC setpoint is reached from the present TDC setpoint after a number of TDC setpoints that are between the present TDC setpoint and the new TDC set point are reached.

2. The method according to claim 1, wherein the plurality of optical group delay tuning elements are ring-resonators and wherein the tuning coefficients of each ring-resonator controls a free-spectral-range (FSR) of the ring-resonator which adjusts a center frequency of an optical group delay response of the ring-resonator.

3. The method according to claim 1, wherein the plurality of optical group delay tuning elements are waveguide delay lines and wherein the tuning coefficient of each waveguide delay line adjusts an optical path length of the waveguide delay line.

4. The method according to claim 1, wherein the plurality of optical group delay tuning elements are Bragg grating elements and wherein the tuning coefficient of each Bragg Grating element adjusts a resonant frequency of the Bragg grating element.

5. The method according to claim 1, wherein the plurality of optical group delay tuning elements are liquid-crystal or liquid-crystal-on-silicon (LCOS) variable-phase-retarding pixels and wherein the tuning coefficient of each pixel is a voltage which controls a phase-retardance of each pixel.

6. The method according to claim 1, wherein the plurality of optical group delay tuning elements are etalons, and wherein the tuning coefficient of each etalon controls a free-spectral-range (FSR) of the etalon which adjusts a center frequency of an optical group delay response of the etalon.

7. The method according to claim 6, wherein the etalons each have a resistive heating element attached thereto and the FSRs of the etalons are controlled by varying etalon temperatures which are controlled by varying voltages supplied to the resistive heating elements.

8. The method according to claim 6, wherein the FSRs of the etalons are periodically varied.

9. The method according to claim 1, further comprising:
   specifying a time period for reaching the new TDC setpoint.

10. The method according to claim 1, further comprising:
    stopping the control of the tuning coefficients before the new TDC setpoint has been reached, wherein the TDC setpoint reached when the control is stopped is a valid TDC setpoint.

11. A tunable dispersion compensator comprising:
    at least first and second optical group delay tuning elements; and
    a controller configured to control tuning coefficients of the first and second optical group delay tuning elements to track in time target tuning coefficient trajectories that have been defined with respect to time for the first and second optical group delay tuning elements, respectively, such that a new TDC setpoint for the optical group delay tuning elements is reached from the present TDC setpoint after a number of TDC setpoints that are between the present TDC setpoint and the new TDC set point are reached.

12. The tunable dispersion compensator according to claim 11, wherein the plurality of optical group delay tuning elements are etalons, and wherein the tuning coefficient of each etalon controls a free-spectral-range (FSR) of the etalon which adjusts a center frequency of an optical group delay response of the etalon.

13. The tunable dispersion compensator according to claim 12, wherein the etalons each have a resistive heating element attached thereto and the FSRs of the etalons are controlled by varying etalon temperatures which are controlled by varying voltages supplied to the resistive heating elements.

14. The tunable dispersion compensator according to claim 11, wherein the controller independently controls the tuning coefficients of the first and second optical group delay tuning elements.

15. The tunable dispersion compensator according to claim 11, wherein the controller maintains a different set of target tuning coefficient trajectories for each of a plurality of setpoints.

* * * * *